United States Patent Office 3,700,578
Patented Oct. 24, 1972

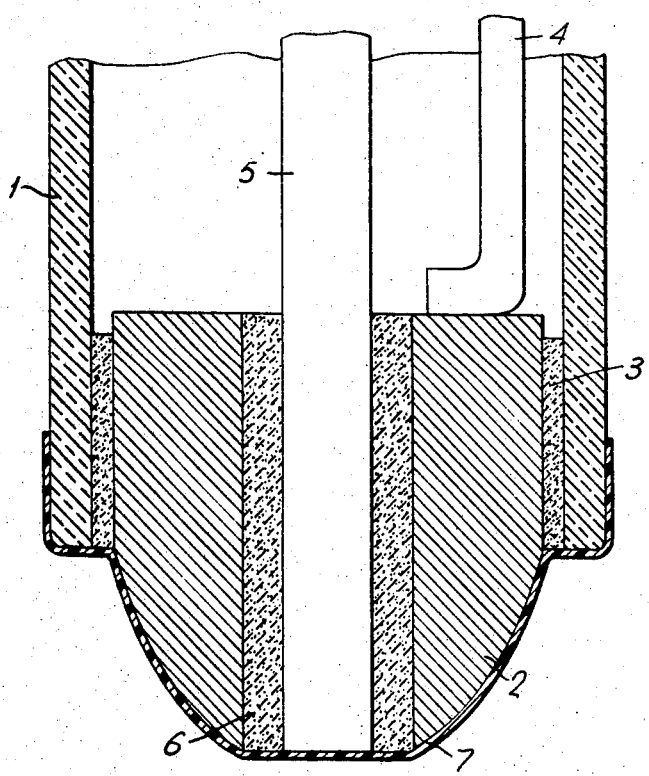

3,700,578
APPARATUS FOR MEASURING THE CONCENTRATION OF DISSOLVED OXYGEN IN AN AQUEOUS SOLUTION
John Stephen Clifton, Harpenden, and Dawood Parker, London, England, assignors to National Research Development Corporation, London, England
Filed Aug. 10, 1970, Ser. No. 62,553
Claims priority, application Great Britain, Aug. 11, 1969, 40,041/69
Int. Cl. G01n 27/46
U.S. Cl. 204—195 P                          4 Claims

ABSTRACT OF THE DISCLOSURE

A membrane of silicone rubber is arranged in contact with two electrodes, for example of silver and lead respectively, so that an electrochemical cell will be formed when water with an appropriate ion content is absorbed by the membrane. In use the characteristics of the cell are affected by oxygen diffusing into the membrane from a solution under investigation.

---

This invention relates to apparatus for measuring the concentration of dissolved oxygen in an aqueous solution.

A known form of apparatus of this kind comprises a pair of electrodes, an electrolytic medium in contact with both electrodes so as to form an electrochemical cell (which may be a voltaic cell or a polarographic cell), and a membrane which is permeable to oxygen and is arranged with one face in contact with said medium and the other face exposed for contact with a solution to be investigated; in the operation of this form of apparatus, a solution under investigation is separated from the cell by the membrane, through which oxygen diffuses into the cell so as to affect its characteristics to an extent dependent on the concentration of oxygen in the solution. With this known form of apparatus the response to changes in oxygen concentration in a solution under investigation is usually relatively slow, and it is accordingly an object of the invention to provide apparatus of the kind specified which is improved in this respect.

Apparatus of the kind specified is commonly used for determining the oxygen tension of biological fluids such as blood, and for this purpose it is desirable that the apparatus should be readily amenable to steam sterilisation. This is, however, somewhat difficult to achieve with the known form of apparatus referred to.

In accordance with the invention the known form of apparatus referred to above is modified by omitting the conventional electrolytic medium, by making the membrane of silicone rubber, and by arranging the membrane in contact with both electrodes.

Thus an apparatus according to the invention comprises a pair of electrodes spaced from each other and a membrane of silicone rubber having one face in contact with both electrodes and the other face exposed for contact with a solution to be investigated.

It has been found that a membrane of silicone rubber is capable of absorbing water, and as a result an apparatus according to the invention may be activated for use by bringing the membrane into contact for a sufficient time with an aqueous solution containing a concentration of hydroxyl ions such that an electrochemical cell will be constituted by virtue of the water absorbed by the membrane; it will often be found that solutions of the kind which are commonly investigated using such an apparatus contain an adequate concentration of hydroxyl ions for this purpose, in which case the apparatus may simply be activated by means of a solution of the kind which is to be investigated. It may, however, be preferred to provide within the apparatus itself a source of hydroxyl ions which will diffuse into the membrane when it absorbs water, for example in the form of crystals of a suitable substance such as ammonium sulphate disposed in contact with the membrane; in this case the apparatus may be activated for use by bringing the membrane into contact for a sufficient time with water (which may be pure) in either the liquid or the vapour state, the latter normally being preferred because a shorter time is required to complete the activation. In particular the activation can be brought about by subjecting the apparatus to a conventional process of steam sterilisation, which presents no problems because of the omission of the conventional electrolytic medium and the use of silicone rubber for the membrane.

In use the characteristics of the cell thus constituted will be affected by oxygen diffusing into the membrane, and it will be appreciated that the distance the oxygen has to travel before taking effect may be made relatively small, so as to ensure a rapid response to changes in oxygen concentration in a solution under investigation; by making the membrane sufficiently thin, it is possible to achieve response times of the order of 0.1–1 second. In the case where no internal source of ions is provided in the apparatus, it is found that the characteristics of the cell are also markedly dependent on the pH value of the solution in which the apparatus is used; in this case, therefore, the use of the apparatus must be restricted, if reliable results are to be obtained, to solutions whose pH values are substantially invariant. The sensitivity to the pH value of the solution is much less in the case where an internal source of ions is provided, and can be reduced to insignificance in this case by increasing the thickness of the membrane (with a consequent sacrifice in respect of the response time and the ease of activation of the apparatus). In both cases, of course, if absolute measurements of oxygen concentration are required the apparatus must first be calibrated using a standardised solution.

In order to ensure intimate contact between the membrane and the electrodes, and thereby preclude the possibility of a film of water being formed on the electrode side of the membrane when the apparatus is activated, it is preferred that the membrane should be formed in situ by a suitable coating process. This may conveniently be performed by the application of a solution of silicone rubber a suitable solvent such as xylene; the thickness of the resultant membrane can readily be controlled by section of the proportions of the solvent. Having regard to the factors discussed above, a suitable value for the thickness of the membrane will normally be of the order of 0.001 inch.

The electrodes may suitably be of silver and lead respectively, being adapted respectively to constitute the cathode and anode of a voltaic cell completed by the electrolyte held in the membrane; with this arrangement the output of, or the maximum current that may be drawn from, the cell will be dependent upon (normally linearly proportional to) the oxygen concentration in a solution under investigation, by virtue of a reaction involving the diffused oxygen at the interface between the cathode and the membrane.

One arrangement in accordance with the invention will now be described by way of example with reference to the accompanying drawing, which is a diagrammatic sectional view of part of a probe for measuring the oxygen tension of a biological fluid.

Referring to the drawing, the probe comprises a glass tube 1 having a diameter of about 0.12 inch, within one end of which is disposed a lead pellet 2 having a projected tapered nose, the pellet 2 being secured in position by means of an epoxy resin 3 and having secured to it a connecting wire 4 which passes through the tube 1. The pellet has formed in it a central hole of diameter 0.04 inch within which is centrally disposed one end of a silver wire 5 of diameter 0.02 inch, the wire 5 also extending through the tube 1; the wire 5 is secured in the hole in the pellet 2 by means of an epoxy resin 6 with its end surface flush with the free end of the pellet 2.

In manufacture of the probe, when the structure so far described has been fabricated, the nose of the pellet 2 is wetted with an aqueous solution of ammonium sulphate, which is then allowed to dry to leave on the surface of the lead minute crystals which subsequently serve as a source of hydroxyl ions. The end of the tube 1 in which the pellet 2 is mounted is then dipped into a solution of silicone rubber in xylene and after removal from the solution the adherent material is allowed to dry to form a membrane 7 of silicone rubber which covers the projecting portion of the pellet 2 and the end surface of the wire 5.

Before use the probe described above is subjected to a standard steam sterilisation process involving autoclaving for about 20 minutes, this serving also to activate the probe by completing the required electrochemical cell.

Where a probe is required solely for use in investigating solutions of high and constant pH value, it is possible to simplify the arrangement described above by omitting the ammonium sulphate crystals, since in this case no internal source of hydroxyl ions will be required.

We claim:
1. An apparatus for use in measuring the concentration of dissolved oxygen in an aqueous solution, said apparatus comprising:
a solid structure incorporating a pair of electrodes and means holding said electrodes in spaced apart, insulated relationship; and
a silicone rubber membrane having first and second faces, said first face being in direct contact with parts of said solid structure, including both of said electrodes, without the inclusion of any liquid material between said electrodes and said first face of the membrane, and said second face being exposed for contact with a solution to be investigated.

2. An apparatus according to claim 1, further comprising a source of hydroxyl ions which will diffuse into the membrane when it absorbs water.

3. An apparatus according to claim 1, in which said electrodes are respectively adapted to constitute the cathode and anode of a voltaic cell.

4. An apparatus as claimed in claim 3, in which said membrane is adherent to said solid structure over the whole area of said membrane.

References Cited

UNITED STATES PATENTS

| | | | |
|---|---|---|---|
| 2,098,813 | 7/1963 | Beebe et al. | 204—195 |
| 3,394,069 | 7/1968 | Solomons | 204—195 |
| 3,510,420 | 5/1970 | Mills | 204—195 |
| 3,575,836 | 4/1971 | Sternberg | 204—195 |

FOREIGN PATENTS

| | | | |
|---|---|---|---|
| 1,040,823 | 9/1966 | Great Britain | 204—195 |

TA- HSUNG TUNG, Primary Examiner

U.S. Cl. X.R.

204—1 T